United States Patent
Miyachi

(10) Patent No.: US 8,513,123 B2
(45) Date of Patent: Aug. 20, 2013

(54) METHOD OF MANUFACTURING SOLID ELECTROLYTIC CAPACITOR

(75) Inventor: Yuji Miyachi, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/422,198

(22) Filed: Mar. 16, 2012

(65) Prior Publication Data

US 2012/0233827 A1    Sep. 20, 2012

(30) Foreign Application Priority Data

Mar. 18, 2011 (JP) ................................ 2011-061026

(51) Int. Cl.
 *H01L 21/44* (2006.01)
(52) U.S. Cl.
 USPC .......... 438/685; 438/648; 438/661; 29/25.03; 257/761
(58) Field of Classification Search
 USPC ......... 29/25.03; 438/648, 661, 685; 257/761
 See application file for complete search history.

(56) References Cited

U.S. PATENT DOCUMENTS

| | | | |
|---|---|---|---|
| 3,496,075 A * | 2/1970 | Silgailis ...................... 205/200 |
| 5,605,561 A * | 2/1997 | Iwabuchi et al. ............... 75/364 |
| 5,635,053 A * | 6/1997 | Aoki et al. .................... 205/746 |
| 6,421,228 B2 * | 7/2002 | Araki ............................ 361/523 |
| 7,248,461 B2 * | 7/2007 | Takagi et al. ................. 361/523 |
| 7,342,774 B2 * | 3/2008 | Hossick-Schott et al. .... 361/528 |
| 2009/0185330 A1 | 7/2009 | Breznova et al. |

FOREIGN PATENT DOCUMENTS

| | | |
|---|---|---|
| JP | 10-149955 A | 6/1998 |
| JP | 2009-177174 A | 8/2009 |

* cited by examiner

*Primary Examiner* — Jarrett Stark
*Assistant Examiner* — Nicholas Tobergte
(74) *Attorney, Agent, or Firm* — Westerman, Hattori, Daniels & Adrian, LLP

(57) ABSTRACT

A method of manufacturing a solid electrolytic capacitor includes the steps of forming an anode element by sintering powders of a valve metal, washing the anode element with a first wash solution, forming a dielectric film on the anode element after the washing step, and forming a solid electrolytic layer on the dielectric film. The first wash solution is an aqueous solution containing ammonia and hydrogen peroxide.

7 Claims, 5 Drawing Sheets

METHOD OF MANUFACTURING SOLID ELECTROLYTIC CAPACITOR

This nonprovisional application is based on Japanese Patent Application No. 2011-061026 filed with the Japan Patent Office on Mar. 18, 2011, the entire contents of which are hereby incorporated by reference.

BACKGROUND OF THE INVENTION

1. Field of the Invention

The present invention relates to a method of manufacturing a solid electrolytic capacitor and particularly to a method of manufacturing a solid electrolytic capacitor including an anode element made of a sintered body.

2. Description of the Related Art

In order to achieve reduction in size and increase in capacity of a capacitor, various capacitors have conventionally been developed. Among others, a solid electrolytic capacitor has widely been known as a capacitor suitable for reduction in size. A solid electrolytic capacitor includes an anode element, a dielectric film provided on the anode element, and a solid electrolytic layer provided on the dielectric film, and it has such excellent performance as a large capacity in spite of its small size.

A solid electrolytic capacitor including as an anode element, a sintered body obtained by sintering powders of a valve metal represents one of the solid electrolytic capacitors above. Since such a solid electrolytic capacitor includes a porous anode element, it can particularly have such excellent characteristics as a large capacity in spite of its small size.

Currently, in order to further improve the characteristics of the solid electrolytic capacitor including the anode element made of the sintered body above, technological developments have been promoted. For example, Japanese Patent Laying-Open No. 10-149955 describes thinly shaving a surface of an anode element through electrical discharge machining in order to eliminate clogging in the surface of the anode element. In addition, for example, Japanese Patent Laying-Open No. 2009-177174 describes etching of a surface of an anode element with an organic acid in order to remove a natural oxide film on the surface of the anode element.

Further, a technique for decreasing a particle size of powders of a valve metal, which is a source material for an anode element, has also been developed. By decreasing a particle size of powders, a surface area of the anode element can further be increased and hence a surface area of a dielectric film can further be increased. Therefore, significant increase in capacity can be achieved. Such an anode element as fabricated with powders small in particle size has attracted attention as a high-CV anode element having a CV value not lower than 100,000 μFV/g.

SUMMARY OF THE INVENTION

As described above, various techniques aiming at improvement in performance of a solid electrolytic capacitor have been developed, however, a technique for further improvement in performance is also currently demanded and a solid electrolytic capacitor achieving further higher performance should be provided.

Then, an object of the present invention is to provide a method of manufacturing a solid electrolytic capacitor capable of manufacturing a solid electrolytic capacitor of high performance.

The present inventor conducted various studies about a solid electrolytic capacitor including a high-CV anode element, and then found that the solid electrolytic capacitor tends to become lower in capacity as operating hours are longer, although it is high in initial capacity. In addition, based on this finding, the present inventor also studied a solid electrolytic capacitor having a conventional anode element, and then found out that this solid electrolytic capacitor tends to become lower in capacity similarly to the high-CV anode element when operating hours are significantly long (when useful service life required of a solid electrolytic capacitor is greatly exceeded), although it sufficiently achieves performance currently required of a solid electrolytic capacitor.

Such finding as above has not been obtained so far, and long-time stability of performance of solid electrolytic capacitors including a conventional anode element and a high-CV anode element respectively has not been a serious issue. Then, paying attention to the possibility of further improvement in performance of a solid electrolytic capacitor in terms of long-term stability based on the finding above, the present inventor continued dedicated studies and completed the present invention.

Namely, the present invention is directed to a method of manufacturing a solid electrolytic capacitor including the steps of forming an anode element by sintering powders of a valve metal, washing the anode element with a first wash solution formed from an aqueous solution containing ammonia and hydrogen peroxide, forming a dielectric film on the anode element after the washing step, and forming a solid electrolytic layer on the dielectric film.

According to the present invention, a method of manufacturing a solid electrolytic capacitor of high performance, which has high long-term stability, can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
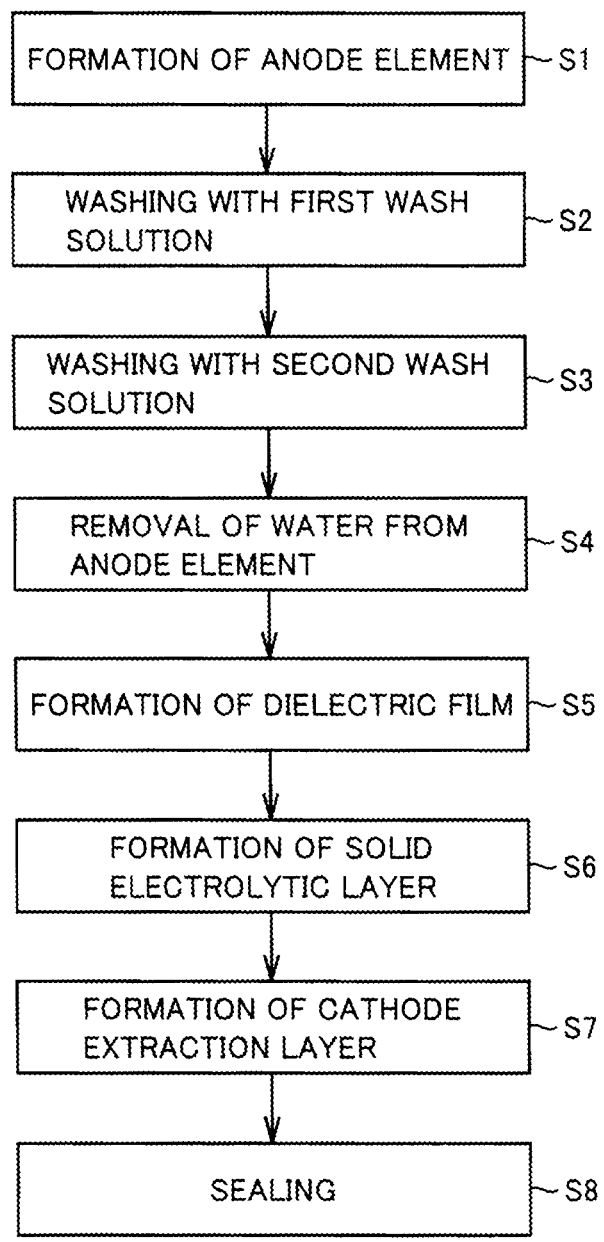
FIG. 1 is a flowchart showing one example of a method of manufacturing a solid electrolytic capacitor according to an embodiment.

An embodiment of a method of manufacturing a solid electrolytic capacitor according to the present invention will be described hereinafter with reference to FIGS. 1 to 6. The embodiment below is by way of example and the present invention can be carried out in various embodiments within the scope of the present invention. It is noted that, in the drawings of the present invention, the same or corresponding elements have the same reference characters allotted.

(Step of Forming Anode Element)

Figure 2:
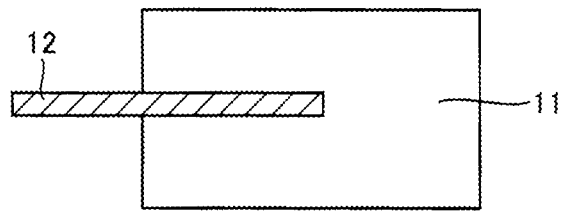
FIGS. 2 to 5 are cross-sectional views schematically showing a process for manufacturing a solid electrolytic capacitor according to the embodiment.

Initially, as shown in FIGS. 1 and 2, an anode element 11 on which an anode lead 12 is erected is formed (step S1). For example, anode element 11 in FIG. 2 is formed as follows.

Namely, initially, powders of a valve metal are prepared. Then, the powders are molded in a desired shape such as a parallelepiped shape such that one end side of rod-shaped anode lead 12 is buried in the powders above. Then, by sintering the molded powders, anode element 11 made of a sintered body and having a porous structure is formed.

Tantalum, niobium, titanium, and the like can be employed as a valve metal. In terms of less leakage current in a solid electrolytic capacitor, tantalum is more preferably used. A temperature for sintering a molded body should only be a temperature at which powders of a valve metal used can be sintered, and for example, the temperature can be not lower than 1100° C. and not higher than 1500° C. It is noted that, as powders of a valve metal each have a smaller particle size, sintering at a lower sintering temperature can be carried out.

Here, the present inventor has found that, in manufacturing a solid electrolytic capacitor with the use of a high-CV anode element having a CV value not lower than 100,000 μFV/g, deterioration in such characteristics as a capacity can more effectively be suppressed by performing the step of washing with a first wash solution which will be described later.

Therefore, in the present step, by forming an anode element having a CV value not lower than 100,000 μFV/g, characteristics of a solid electrolytic capacitor can more significantly be improved and hence long-term stability thereof can greatly be improved. It is noted that a CV value refers to a product of a capacity (C) per mass of an anode element and a chemical conversion voltage (V) at the time when a dielectric is formed on a surface of the anode element, and as a CV value is higher, an anode element has a larger capacity.

Though a material for anode lead 12 is not particularly limited, a metal commonly used for anode element 11 is preferably used in terms of a manufacturing process.

(Step of Washing with First Wash Solution)

Then, as shown in FIG. 1, anode element 11 is washed with a first wash solution (step S2). The first wash solution is an aqueous solution containing ammonia and hydrogen peroxide and exhibiting alkalinity. For example, anode element 11 can be washed by immersing anode element 11 in the first wash solution. Anode element 11 can be washed also by pouring the first wash solution over anode element 11.

By washing anode element 11 with the first wash solution, a solid electrolytic capacitor having high long-term stability can be manufactured. Though the reason therefor is unclear, one reason may be that the first wash solution removes such residues as unsintered particles of a valve metal or a binder remaining in anode element 11. Namely, as a result of removal of the residues, the surface of anode element 11 is cleaned, a dielectric film 13 can more uniformly be formed in step S5 which will be described later (see FIG. 3), and a solid electrolytic layer 14 (see FIG. 4) can more uniformly be formed further on uniformly formed dielectric film 13 in step S6 which will be described later. Therefore, it is expected that peel-off of solid electrolytic layer 14, occurrence of cracks in solid electrolytic layer 14, and the like can be suppressed, and consequently, reliability of a solid electrolytic capacitor is improved.

In addition, another reason may be that the surface of anode element 11 becomes hydrophilic as a result of washing of anode element 11 with the first wash solution. Namely, anode element 11 made of a sintered body has a complicated construction with small voids, and in addition, the surface thereof is hydrophobic, which may make it difficult for a chemical conversion treatment solution formed from an aqueous solution to sufficiently permeate therein. In order to address this, by washing anode element 11 with the first wash solution, the surface of anode element 11 washed with the first wash solution can be hydrophilic, so that a chemical conversion treatment solution can sufficiently permeate into anode element 11 in step S5 which will be described later and consequently dielectric film 13 can more uniformly be formed.

Moreover, since no great difference in initial capacity of a solid electrolytic capacitor was seen between a case where anode element 11 was washed with the first wash solution and a case where anode element 11 was not washed therewith, the following may be possible. Namely, in a case where anode element 11 is washed with the first wash solution, as compared with such a conventional method as thinly shaving a surface of an anode element through electrical discharge machining or etching of a surface of an anode element with an organic acid, removal of the surface itself of anode element 11 is considered to be suppressed. In other words, it is estimated that the first wash solution has excellent capability to remove residues on anode element 11, whereas it has no or sufficiently low capability to etch anode element 11 itself as compared with such a conventional wash solution as an organic acid. Further, since tantalum is highly resistant to an alkaline aqueous solution, etching of anode element 11 by the first wash solution can effectively be suppressed in a case where a tantalum sintered body is employed for anode element 11, and thus lowering in capacity of anode element 11 during washing treatment can effectively be suppressed.

Furthermore, yet another reason may be that a natural oxide film formed on the surface of anode element 11 is removed by the first wash solution. Namely, though a valve metal is not readily etched by the first wash solution, an oxide film of the valve metal is readily removed by the first wash solution. Therefore, a natural oxide film produced during a period from formation of anode element 11 until chemical conversion treatment can be removed by washing with the first wash solution. Therefore, it is expected that further cleaned anode element 11 can be subjected to chemical conversion treatment, and consequently, dielectric film 13 can more uniformly be formed.

In the first wash solution, ammonia concentration is preferably not lower than 0.1 mol/l and not higher than 1.0 mol/l and concentration of hydrogen peroxide is preferably not lower than 0.5 mol/l and not higher than 1.0 mol/l. By such preparation as concentration of ammonia and/or concentration of hydrogen peroxide in the first wash solution being within the range above, anode element 11 can sufficiently be washed and etching of anode element 11 by the first wash solution and resultant lowering in capacity thereof can effectively be suppressed. A method of preparing a first wash solution is not particularly limited, and for example, it can be prepared, for example, by mixing ammonia water, a hydrogen peroxide solution, and water.

In addition, the present inventor has found that long-term stability of a manufactured solid electrolytic capacitor can further be enhanced by washing anode element 11 with the first wash solution at a temperature not lower than 80° C. and not higher than 85° C. This may be because a large number of fine bubbles can be produced in the first wash solution by heating the first wash solution in the temperature range above and this phenomenon can allow the first wash solution to rapidly spread even into the inside of anode element 11. It is noted that, in a case of washing anode element 11 with the heated first wash solution, anode element 11 is preferably immersed in the first wash solution for washing.

(Step of Washing with Second Wash Solution)

Then, as shown in FIG. 1, anode element 11 that has been washed with the first wash solution may be washed with a second wash solution (step S3). Water having high purity such as ultrapure water, ion exchange water, or aqua pura can be used as the second wash solution, and regarding the washing method, as in the step above, anode element 11 may be immersed in the second wash solution or the second wash solution may be poured over anode element 11. Through the present step, the first wash solution adhering to the surface of anode element 11 can be removed so that the surface of anode element 11 can further be cleaned and hence dielectric film 13 can more uniformly be formed. In addition, variation in concentration of a chemical conversion treatment solution due to mixture of the first wash solution remaining on anode element 11 and the chemical conversion treatment solution can be suppressed.

(Step of Removing Water)

Then, as shown in FIG. 1, water may be removed from anode element 11 after washing with the first wash solution or from anode element 11 after washing with the second wash solution (step S4). The present step can be performed, for example, by placing anode element 11, to which water adheres, in a drying oven and heating the anode element. Alternatively, this step can be performed also by blowing anode element 11, to which water adheres, with cold or warm air.

(Step of Forming Dielectric Film on Anode Element)

Figure 3:
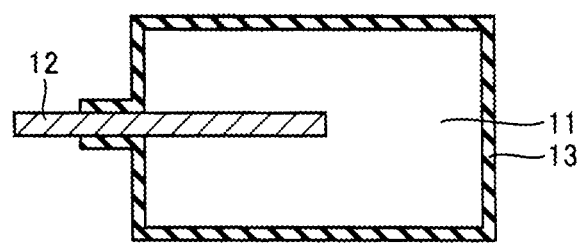

Then, as shown in FIGS. 1 and 3, dielectric film 13 is formed on the surface of anode element 11 (step S5). The present step can be performed, for example, by immersing anode element 11 in a chemical conversion treatment solution and applying a voltage to anode element 11 for a prescribed period of time. More specifically, anode element 11 is immersed in a chemical conversion treatment solution such as an ammonium adipate aqueous solution, a phosphoric acid aqueous solution, or a nitric acid aqueous solution, and a voltage not lower than 10 V and not higher than 20 V is applied to anode element 11 for 5 hours or longer. Thus, a valve metal forming a surface portion of anode element 11 is converted to an oxide to thereby form dielectric film 13.

Since the surface of anode element 11 has been cleaned in the step of washing with the first wash solution described above (step S2) in which such residues as unsintered particles of a valve metal or a binder that adhere to the surface of anode element 11 are removed, in the present step, dielectric film 13 can more uniformly be formed on the surface of anode element 11. It is noted that, in a case where a valve metal making up anode element 11 is Ta, Nb, or Ti, dielectric film 13 is composed of $Ta_2O_5$, $Nb_2O_5$, or $TiO_2$.

(Step of Forming Solid Electrolytic Layer)

Figure 4:
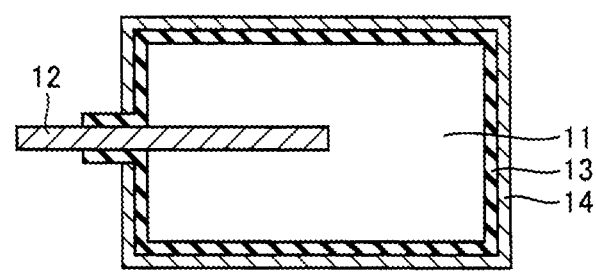

Then, as shown in FIGS. 1 and 4, solid electrolytic layer 14 is formed on dielectric film 13 (step S6). A material for solid electrolytic layer 14 is not particularly limited, and manganese dioxide, TCNQ complex salt (7,7,8,8-tetracyanoquinodimethane), or the like can be employed. In addition, such a conductive polymer as polythiophene and derivatives thereof, polypyrrole and derivatives thereof, polyaniline and derivatives thereof, and polyfuran and derivatives thereof can also be employed. Among these, from a point of view of high conductivity, a conductive polymer is preferably employed.

A conductive polymer has a structure in which a dopant is provided to a polymer such as polythiophene serving as a basic skeleton, and it can be formed, for example, by carrying out chemical polymerization and/or electrolytic polymerization by using a precursor of a polymer and a dopant. For example, 3,4-ethylenedioxythiophene, 3-alkylthiophene, pyrrole, N-methylpyrrole, N,N-dimethylaniline, N-alkylaniline, or the like can be employed as the precursor of the polymer. Among these, solid electrolytic layer 14 having particularly high conductivity can be formed by forming polypyrrole with the use of pyrrole.

In addition, a dopant is not particularly limited, and for example, a sulfonic acid compound such as alkyl sulfonic acid, aromatic sulfonic acid or polycyclic aromatic sulfonic acid, nitric acid, sulfuric acid, or the like can be employed. Moreover, in a case of carrying out chemical polymerization, chemical polymerization is preferably carried out by using not only a precursor and a dopant but also an oxidizing agent, and sulfonic acid metal salt representing one sulfonic acid compound is preferred in terms of its capability to function as a dopant and oxidizing agent.

One method of forming solid electrolytic layer 14 having polypyrrole as a basic skeleton through chemical polymerization and electrolytic polymerization will be described below by way of example of a method of forming solid electrolytic layer 14.

Initially, anode element 11 is immersed in a chemical polymerization solution containing an oxidizing agent, a dopant, and pyrrole representing a precursor of polypyrrole, to thereby impregnate anode element 11 with the chemical polymerization solution. Then, anode element 11 is taken out of the chemical polymerization solution and chemical polymerization of pyrrole is caused on dielectric film 13 formed on the surface of anode element 11, to thereby form a first polypyrrole layer. Then, anode element 11 having the first polypyrrole layer formed thereon is immersed in an electrolytic polymerization solution containing a dopant and pyrrole. Then, by feeding a current to the first polypyrrole layer in the electrolytic polymerization solution, electrolytic polymerization of pyrrole is caused on the first polypyrrole layer to thereby form a second polypyrrole layer on the first polypyrrole layer. Thus, solid electrolytic layer 14 constituted of the first polypyrrole layer and the second polypyrrole layer having polypyrrole as a basic skeleton is formed on dielectric film 13.

(Step of Forming Cathode Extraction Layer)

Figure 5:
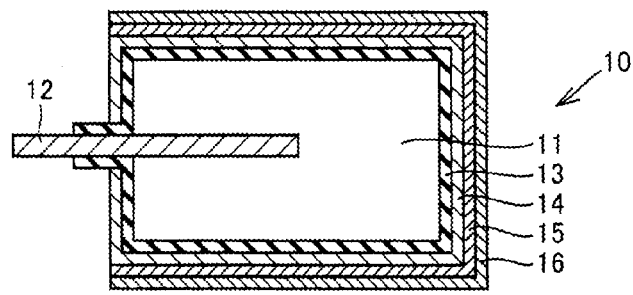

Then, as shown in FIGS. 1 and 5, a cathode extraction layer is formed on solid electrolytic layer 14 (step S7). The cathode extraction layer should only have conductivity, and in the present embodiment, a case where the cathode extraction layer constituted of a carbon layer 15 and a silver layer 16 will be described.

Initially, anode element 11 having solid electrolytic layer 14 formed is immersed in a dispersion in which carbon particles have been dispersed, followed by drying treatment. Thus, carbon layer 15 is formed on solid electrolytic layer 14. Then, anode element 11 having carbon layer 15 formed is immersed in a dispersion in which silver particles have been dispersed, followed by drying treatment. Thus, silver layer 16 is formed on carbon layer 15. Through the present step, the cathode extraction layer is formed and a capacitor element 10 is formed through steps S1 to S7.

(Step of Sealing Capacitor Element)

Figure 6:
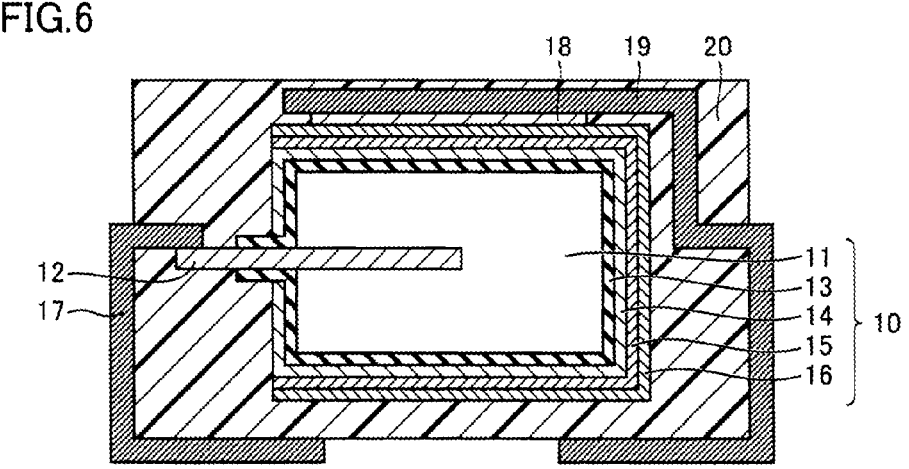
FIG. 6 is a cross-sectional view schematically showing one example of a solid electrolytic capacitor manufactured in the embodiment.

Then, as shown in FIGS. 1 and 6, capacitor element 10 is sealed to fabricate a solid electrolytic capacitor. Though a sealing method is not particularly limited, for example, the following method is available.

Namely, initially, an anode terminal 17 is connected to exposed one end of anode lead 12, and an adhesive layer 18 is formed on silver layer 16, to which one end of a cathode terminal 19 is connected. Adhesive layer 18 should only have conductivity and adhesiveness, and for example, an adhesive containing a silver filler can be employed. In addition, anode terminal 17 and cathode terminal 19 should only have conductivity, and for example, a terminal formed by coating a surface of a steel wire with copper can be employed.

Then, capacitor element 10 is sealed with an exterior resin 20 such that the other ends of anode terminal 17 and cathode terminal 19 are exposed. Though exterior resin 20 is not particularly limited, an insulator is preferred and for example, epoxy resin can be employed. Then, exposed anode terminal 17 and cathode terminal 19 are bent along exterior resin 20, followed by aging treatment, to thereby manufacture a solid electrolytic capacitor shown in FIG. 6.

According to the method of manufacturing a solid electrolytic capacitor in the present embodiment, before dielectric film 13 is formed on the surface of anode element 11, anode element 11 is washed with the first wash solution. The first wash solution is an aqueous solution containing ammonia and hydrogen peroxide, and the surface of anode element 11 can be cleaned by washing anode element 11 with such a first wash solution. Thus, since dielectric film 13 can be formed on the cleaned surface of anode element 11, dielectric film 13 can uniformly be formed and further solid electrolytic layer 14 can uniformly be formed. Thus, since adhesion between dielectric film 13 and solid electrolytic layer 14 can be enhanced, peel-off of solid electrolytic layer 14, occurrence of cracks in solid electrolytic layer 14, and the like can be suppressed as compared with conventional examples, and consequently, a solid electrolytic capacitor having high long-term stability can be manufactured.

The present inventor has found that a solid electrolytic capacitor having an anode element having a CV value not lower than 100,000 μFV/g in particular tends to be great in deterioration in such characteristics as a capacity involved with longer operating hours and that long-term stability can significantly be improved by treating this anode element with the first wash solution.

EXAMPLES

The present invention will be described hereinafter in further detail with reference to an Example, however, the present invention is not limited thereto. Specifically, a solid electrolytic capacitor was manufactured by using the manufacturing method according to the present invention as Example 1 and a solid electrolytic capacitor was manufactured by using a conventional manufacturing method as Comparative Example 1. Then, long-term stability of the solid electrolytic capacitors was evaluated.

<Method of Manufacturing Solid Electrolytic Capacitor>

In the following, with reference to FIGS. 1 to 6, a method of manufacturing a solid electrolytic capacitor in Example 1 will be described and thereafter a method of manufacturing a solid electrolytic capacitor in Comparative Example 1 will be described.

Example 1

Initially, tantalum powders were prepared. Then, the tantalum powders were molded while one end side of anode lead 12 made of tantalum was buried in the tantalum powders. Then, by sintering the molded powders, anode element 11 having a porous structure, in which one end of anode lead 12 had been buried, was fabricated (step S1). A dimension of anode element 11 here was 2.3 mm long×1.8 mm wide×1.1 mm high and the anode element had a CV value of 150,000 μFV/g.

Then, an aqueous solution in which concentrations of ammonia and hydrogen peroxide were 0.3 mol/l and 0.8 mol/l respectively was prepared as the first wash solution. Then, while this aqueous solution was heated to 80° C., anode element 11 was immersed in the aqueous solution for 15 minutes (step S2).

Then, after anode element 11 was taken out of the aqueous solution above, it was immersed in aqua pura at a room temperature serving as the second wash solution for 10 minutes (step S3). Then, after anode element 11 was taken out of aqua pura, it was placed in a drying oven at 100° C. for drying treatment for 10 minutes, to thereby remove water that adhered to the surface of anode element 11 (step S4).

Then, anode element 11 was immersed in a 0.02 mass % phosphoric acid aqueous solution and a voltage of 20 V was applied to this anode element for 5 hours, to thereby subject anode element 11 to chemical conversion treatment (step S5). As a result of this chemical conversion treatment, a $Ta_2O_5$ film serving as dielectric film 13 was formed.

Then, solid electrolytic layer 14 was formed on dielectric film 13 through chemical polymerization and electrolytic polymerization (step S6). Specifically, initially, the anode element having the dielectric film formed was immersed for 5 minutes in an ethanol solution containing pyrrole and adjusted to 25° C., to thereby cause pyrrole to adhere to dielectric film 13. Then, anode element 11 was taken out of the ethanol solution, and in succession, it was immersed for 5 minutes in an aqueous solution containing ammonium persulfate and para-toluenesulfonic acid and adjusted to 25° C. Then, anode element 11 was taken out of the aqueous solution above and dried by being left at a room temperature for 10 minutes. As a result of this operation, the first polypyrrole layer was formed on dielectric film 13. Then, a current of 0.5 mA was fed to the first polypyrrole layer for 3 hours while anode element 11 was immersed in an aqueous solution containing pyrrole and alkylnaphthalenesulfonic acid. As a result of this operation, the second polypyrrole layer was formed on the first polypyrrole layer. Through the operations above, the polypyrrole layer serving as solid electrolytic layer 14 was formed on dielectric film 13.

Then, carbon layer 15 was formed by applying a graphite particle suspension onto solid electrolytic layer 14 followed by drying and further silver layer 16 was formed by applying a solution containing silver particles onto carbon layer 15 followed by drying in atmosphere (step S7). Capacitor element 10 was fabricated through the operations above.

Then, in the capacitor element, anode terminal 17 was welded to anode lead 12, a silver adhesive was applied to silver layer 16 to form adhesive layer 18, and one end of cathode terminal 19 was bonded to adhesive layer 18. Further, capacitor element 10 was sealed with exterior resin 20 such that a part of anode terminal 17 and cathode terminal 19 was exposed. After exposed anode terminal 17 and cathode terminal 19 were bent along exterior resin 20, they were subjected to aging treatment.

Through the manufacturing process above, the solid electrolytic capacitor was fabricated, The fabricated solid electrolytic capacitor had a rated voltage of 6.3 V and it was 3.5 mm long×2.8 mm wide×1.9 mm high. It is noted that, in the present example, 200 solid electrolytic capacitors were manufactured.

Comparative Example 1

In Comparative Example 1, a solid electrolytic capacitor was fabricated with the method the same as in Example 1, except for not performing steps S2 to S4. The fabricated solid electrolytic capacitor had a rated voltage of 6.3 V and it was 3.5 mm long×2.8 mm wide×1.9 mm high. It is noted that, in the present comparative example as well, 200 solid electrolytic capacitors were manufactured.

<LIFE Test>

Each solid electrolytic capacitor manufactured in Example 1 and Comparative Example 1 was subjected to a LIFE test. Specifically, each solid electrolytic capacitor was placed in a thermostat at 125° C., and application of a rated voltage to each solid electrolytic capacitor was continued in the thermostat. Then, relation between an application duration and electrical characteristics of each solid electrolytic capacitor after lapse of each application duration was observed. Measured electrical characteristics are the following four items.

(Capacitance)

Figure 7:
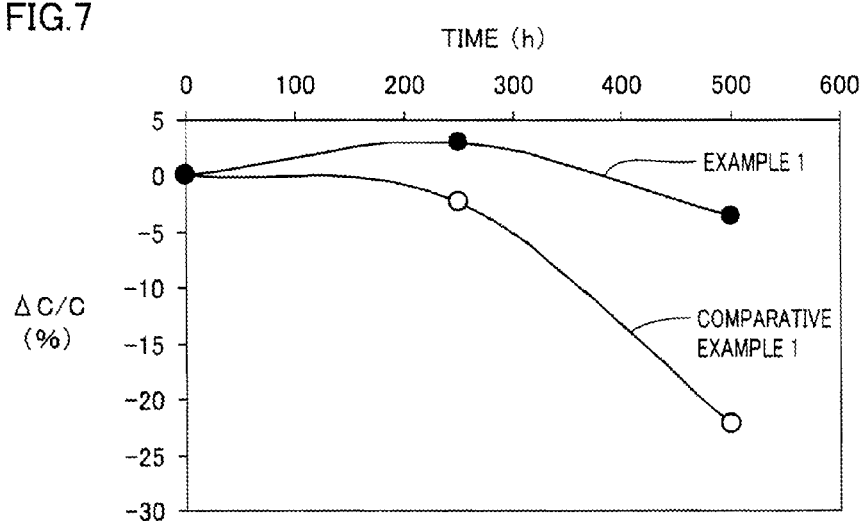
FIG. 7 is a graph showing relation between lapse of time in a LIFE test and a rate of change (%) in capacity in each solid electrolytic capacitor manufactured in Example 1 and Comparative Example 1.

Twenty solid electrolytic capacitors were randomly selected from the solid electrolytic capacitors in each Example and each Comparative Example. Capacitance (μF) at a frequency of 120 Hz, of 20 selected solid electrolytic capacitors in each Example and each Comparative Example was measured by using an LCR meter for 4-terminal measurement, each time each application duration elapsed. Then, with capacitance of the solid electrolytic capacitor for an application duration (h) of 0 hours being denoted as C and capacitance of the solid electrolytic capacitor after lapse of each application duration being denoted as $C_X$, a rate of change in capacitance ΔC/C (%) was calculated based on Equation (1) below. FIG. 7 shows relation between lapse of time (h) in the LIFE test and ΔC/C (%) at each elapsed time of the solid electrolytic capacitors in Example 1 and Comparative Example 1.

$$\Delta C/C(\%) = (C_X - C)/C \times 100 \qquad \text{Equation (1)}$$

(ESR)

Figure 8:
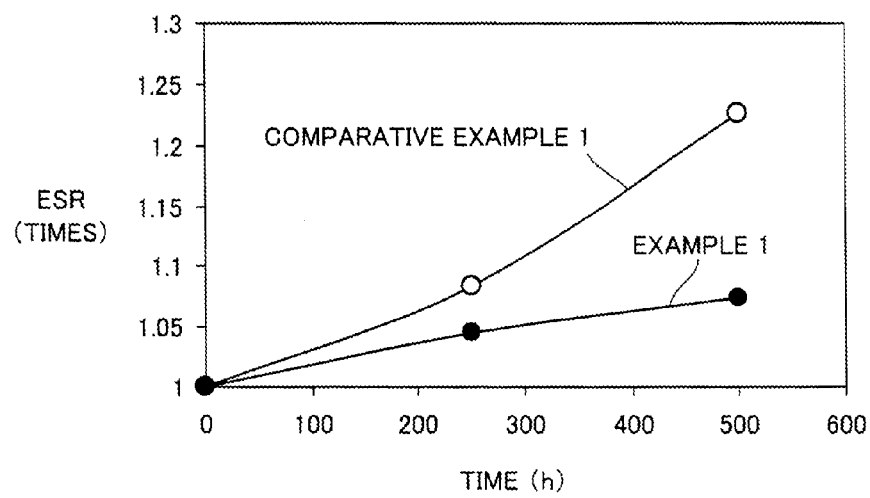
FIG. 8 is a graph showing relation between lapse of time in the LIFE test and a rate of change (times) in ESR in each solid electrolytic capacitor manufactured in Example 1 and Comparative Example 1.

Twenty solid electrolytic capacitors were randomly selected from the solid electrolytic capacitors in each Example and each Comparative Example. ESR (mΩ) at a frequency of 100 kHz, of 20 selected solid electrolytic capacitors in each Example and each Comparative Example was measured by using an LCR meter for 4-terminal measurement, each time each application duration elapsed. Then, a value obtained by dividing a value (mΩ) of ESR of the solid electrolytic capacitor at the time of lapse of each application duration by a value of ESR of the solid electrolytic capacitor for an application duration (h) of 0 hours was calculated as a rate of change (times) in ESR. FIG. 8 shows relation between lapse of time (h) in the LIFE test and a rate of change (times) in ESR at each elapsed time of the solid electrolytic capacitors in Example 1 and Comparative Example 1.

(tan δ)

Figure 9:
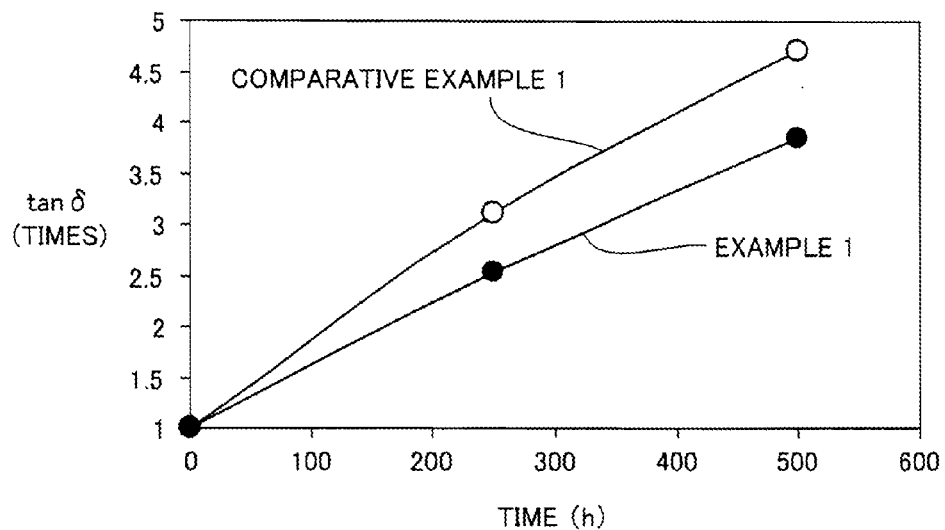
FIG. 9 is a graph showing relation between lapse of time in the LIFE test and a rate of change (times) in tan δ in each solid electrolytic capacitor manufactured in Example 1 and Comparative Example 1.

Twenty solid electrolytic capacitors were randomly selected from the solid electrolytic capacitors in each Example and each Comparative Example. A tangent (tan δ) of a loss angle at a frequency of 120 Hz, of 20 selected solid electrolytic capacitors in each Example and each Comparative Example was measured by using an LCR meter for 4-terminal measurement, each time each application duration elapsed. Then, a value obtained by dividing a value of tan δ of the solid electrolytic capacitor at the time of lapse of each application duration by a value of tan δ of the solid electrolytic capacitor for an application duration (h) of 0 hours was calculated as a rate of change (times) in tan δ. FIG. 9 shows relation between lapse of time (h) in the LIFE test and a rate of change (times) in tan δ at each elapsed time of the solid electrolytic capacitors in Example 1 and Comparative Example 1.

(LC)

Figure 10:
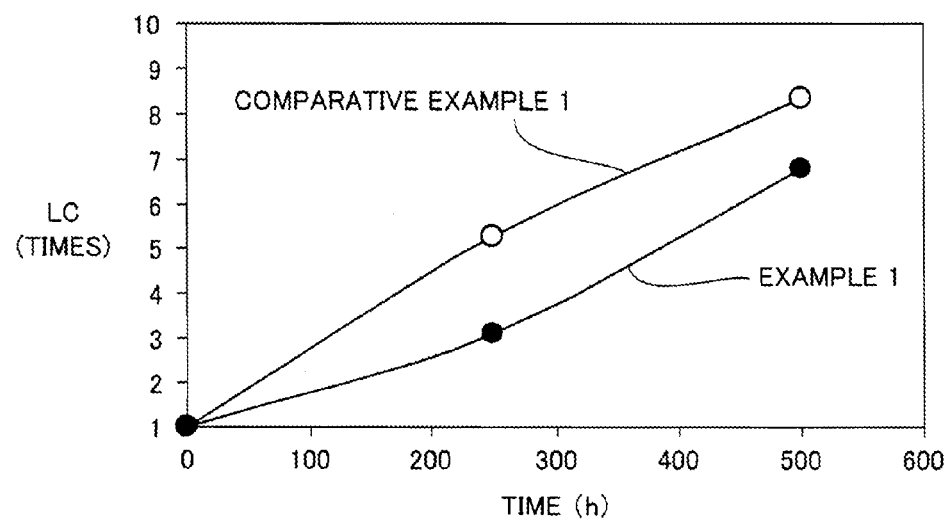
FIG. 10 is a graph showing relation between lapse of time in the LIFE test and a rate of change (times) in LC in each solid electrolytic capacitor manufactured in Example 1 and Comparative Example 1.

Twenty solid electrolytic capacitors were randomly selected from the solid electrolytic capacitors in each Example and each Comparative Example. Twenty selected solid electrolytic capacitors in each Example and each Comparative Example were taken out of the thermostat each time each application duration elapsed, and a rated voltage was applied thereto for 2 minutes. An amount of leakage current (μA) was then measured. Then, a value obtained by dividing a leakage current (LC) of the solid electrolytic capacitor at the time of lapse of each application duration by a value of LC of the solid electrolytic capacitor for an application duration (h) of 0 hours was calculated as a rate of change (times) in LC. FIG. 10 shows relation between lapse of time (h) in the LIFE test and a rate of change (times) in LC at each elapsed time of the solid electrolytic capacitors in Example 1 and Comparative Example 1.

<Evaluation>

Referring to FIG. 7, in the solid electrolytic capacitor manufactured in Comparative Example 1, capacitance significantly lowered with lapse of time in the LIFE test, whereas in the solid electrolytic capacitor manufactured in Example 1, lowering in capacitance was suppressed.

In addition, referring to FIG. 8, in the solid electrolytic capacitor manufactured in Comparative Example 1, ESR significantly increased with lapse of time in the LIFE test, whereas in the solid electrolytic capacitor manufactured in Example 1, increase in ESR was suppressed.

Moreover, referring to FIG. 9, in the solid electrolytic capacitor manufactured in Comparative Example 1, tan δ significantly increased with lapse of time in the LIFE test, whereas in the solid electrolytic capacitor manufactured in Example 1, increase in tan δ was suppressed.

Further, referring to FIG. 10, in the solid electrolytic capacitor manufactured in Comparative Example 1, LC significantly increased with lapse of time in the LIFE test, whereas in the solid electrolytic capacitor manufactured in Example 1, increase in LC was suppressed.

As described above, with regard to four electrical characteristics of the solid electrolytic capacitor, the solid electrolytic capacitor manufactured in Example 1 was excellent in all results in the LIFE test. In addition, as can be seen from the result at 0 hours in each of FIGS. 7 to 10, in a case where a solid electrolytic capacitor was manufactured by performing the step of washing with the first wash solution, high electrical characteristics could be maintained for a long period of time, although noticeable change was not seen in initial electrical characteristics. Therefore, it was found that, according to the manufacturing method in Example 1, a solid electrolytic capacitor of high performance, which had high long-term stability, could be manufactured.

Though the embodiment and the example of the present invention have been described as above, combination of the features in the embodiment and the Example as appropriate is also originally intended.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a solid electrolytic capacitor, comprising the steps of:
   forming an anode element having a CV value not lower than 100,000 μFV/g by sintering tantalum powders;

washing said anode element with a first wash solution formed from an aqueous solution containing ammonia and hydrogen peroxide;

forming a dielectric film on said anode element by chemical conversion treatment after said washing step; and forming a solid electrolytic layer on said dielectric film.

2. The method of manufacturing a solid electrolytic capacitor according to claim 1, wherein in said washing step, said first wash solution at a temperature not lower than 80° C. and not higher than 85° C. is employed.

3. The method of manufacturing a solid electrolytic capacitor according to claim 1, comprising the step of washing said anode element with a second wash solution formed from water, between said step of washing said anode element with a first wash solution and said step of forming a dielectric film.

4. A method of manufacturing a solid electrolytic capacitor, comprising the steps of:

forming an anode element by sintering powders of a valve metal;

washing said anode element with a first wash solution formed from an aqueous solution containing ammonia and hydrogen peroxide;

forming a dielectric film on said anode element after said washing step; and forming a solid electrolytic layer on said dielectric film, wherein in said washing step, said first wash solution at a temperature not lower than 80° C. is employed.

5. The method of manufacturing a solid electrolytic capacitor according to claim 4, further comprising between said step of washing said anode element with a first wash solution and said step of forming a dielectric film, a step of washing said anode element with a second wash solution formed from water.

6. The method of manufacturing a solid electrolytic capacitor according to claim 4, wherein said anode element has a CV value not lower than 100,000 μFV/g.

7. The method of manufacturing a solid electrolytic capacitor according to claim 4, wherein said powders of said valve metal are composed of tantalum.

* * * * *